US006937221B2

(12) United States Patent
Lippert et al.

(10) Patent No.: US 6,937,221 B2
(45) Date of Patent: Aug. 30, 2005

(54) SCANNED BEAM DISPLAY

(75) Inventors: Thomas M. Lippert, Seattle, WA (US); Clarence T. Tegreene, Seattle, WA (US)

(73) Assignee: Microvision, Inc., Bothell, WA (US)

(*) Notice: Subject to any disclaimer, the term of this patent is extended or adjusted under 35 U.S.C. 154(b) by 455 days.

(21) Appl. No.: 09/898,296

(22) Filed: Jul. 2, 2001

(65) Prior Publication Data

US 2002/0024495 A1 Feb. 28, 2002

Related U.S. Application Data

(63) Continuation of application No. 09/144,400, filed on Aug. 31, 1998, now abandoned, which is a continuation-in-part of application No. 09/129,619, filed on Aug. 5, 1998, now abandoned.

(51) Int. Cl.[7] .................................................. G09G 5/00

(52) U.S. Cl. ................................ 345/98; 345/7; 345/8; 345/9; 345/87; 359/630; 359/631; 359/634; 359/636; 348/744; 348/745; 348/750

(58) Field of Search ............................. 345/98, 8, 7, 9; 359/629, 630, 631, 573, 569, 87; 348/744, 745, 750, 751, 756, 757; 250/330–334

(56) References Cited

U.S. PATENT DOCUMENTS

| | | | | |
|---|---|---|---|---|
| 3,634,614 A | | 1/1972 | Geusic | |
| 3,652,956 A | | 3/1972 | Pinnow | |
| 3,891,560 A | | 6/1975 | Chester | |
| 4,979,030 A | | 12/1990 | Murata | |
| 5,355,181 A | | 10/1994 | Ashizaki et al. | |
| 5,467,104 A | | 11/1995 | Furness, III et al. | |
| 5,526,183 A | | 6/1996 | Chen | |
| 5,539,422 A | | 7/1996 | Heacock et al. | |
| 5,543,968 A | | 8/1996 | Freeman et al. | |
| 5,557,444 A | | 9/1996 | Melville et al. | |
| 5,659,430 A | | 8/1997 | Togino | |
| 5,673,139 A | | 9/1997 | Johnson | |
| 5,694,237 A | | 12/1997 | Melville | |
| 5,701,132 A | | 12/1997 | Kollin et al. | |
| 5,751,465 A | | 5/1998 | Melville et al. | |
| 5,903,397 A | | 5/1999 | Melville et al. | |
| 5,933,277 A | * | 8/1999 | Troxell et al. | 359/573 |
| 5,933,279 A | | 8/1999 | Yamazaki | |
| 5,982,528 A | | 11/1999 | Melville | |
| 6,043,799 A | | 3/2000 | Tidwell | |
| 6,046,720 A | | 4/2000 | Melville et al. | |
| 6,097,353 A | * | 8/2000 | Melville et al. | 345/8 |
| 6,433,907 B1 | * | 8/2002 | Lippert et al. | 359/201 |
| 6,445,362 B1 | * | 9/2002 | Tegreene | 345/7 |

FOREIGN PATENT DOCUMENTS

| | | |
|---|---|---|
| EP | 0 344 881 A2 | 12/1989 |
| EP | 0 455 449 A2 | 11/1991 |
| EP | 0 947 974 A1 | 10/1999 |
| GB | 2 186 147 A | 8/1987 |
| WO | WO 90/12387 | 10/1990 |

* cited by examiner

*Primary Examiner*—Henry N. Tran

(57) ABSTRACT

A display apparatus includes first and second IR or other light sources that produce light at respective first and second non-visible wavelengths. The light is modulated according to a desired image. The modulated light is then applied to a wavelength selective phosphor that converts each component of the light to a respective visible wavelength. In one embodiment, the image source is a scanned light beam display that scans an IR light beam onto a screen that carries the phosphor.

24 Claims, 9 Drawing Sheets

SCANNED BEAM DISPLAY

RELATED APPLICATIONS

This application is a continuation of application Ser. No. 09/144,400, filed Aug. 31, 1998 now abandoned. It is also a continuation-in-part of U.S. patent application Ser. No. 09/129,619, filed Aug. 5, 1998 now abandoned.

TECHNICAL FIELD

The present invention relates to low light viewing systems and, more particularly, to low light viewing systems that produce simulated images for a user.

BACKGROUND OF THE INVENTION

Low light vision devices are widely used in a variety of applications, such as night vision goggles ("NVGs"). NVGs allow military, police, or other persons to view objects in nighttime or low light environments.

A typical night vision goggle employs an image intensifier tube (IIT) that produces a visible image in response to light from the environment. To produce the visible image, the image intensifier tube converts visible or non-visible radiation from the environment to visible light at a wavelength readily perceivable by a user.

One prior art NVG 30, shown in FIG. 1, includes an input lens 32 that couples light from an external environment 34 to an IIT 36. The IIT 36 is a commercially available device, such as the G2 or G3 series of IITs available from Edmonds Scientific. As shown in FIG. 2, the IIT 36 includes a photocathode 38 that outputs electrons responsive to light at an input wavelength $\lambda_{IN}$. The electrons enter a microchannel plate 40 that accelerates and/or multiplies the electrons to produce higher energy electrons at its output. Upon exiting the microchannel plate 40, the higher energy electrons strike a screen 42 coated with a cathodoluminescent layer 44, such as a green phosphor. The cathodoluminescent layer 44 responds to the electrons by emitting visible light in regions where the electrons strike the screen 42. The light from the cathodoluminescent layer 44 thus forms the output of the IIT 36.

Returning to FIG. 1, the visible light from the cathodoluminescent layer 44 travels to eye coupling optics 46 that include an input lens 48, a beam splitter 50, and respective eyepieces 52. The lens 48 couples the visible light to the beam splitter 50 that, in turn, directs portions of the visible light to each of the eyepieces 52. Each of the eyepieces 52 turns and shapes the light for viewing by a respective one of the user's eyes 54.

As is known, common photocathodes are often quite sensitive in the IR or near-IR ranges. This high sensitivity allows the photocathode to produce electrons at very low light levels, thereby enabling the IIT 36 to produce output light in very low light conditions. For example, some NVGs can produce visible images of an environment with light sources as dim or dimmer than starlight.

Often, users must train to properly and effectively operate in low vision environments using NVGs for vision. For example, the lenses 48, IIT 36 and eyepieces 52 may induce significant distortion in the viewed image. Additionally, the screen 42 typically outputs monochrome light with limited resolution and limited contrast. Moreover, NVGs often have a limited depth of field and a narrow field of view, giving the user a perception of "tunnel vision." The overall optical effects of distortion, monochromaticity, limited contrast, limited depth of field and limited field of view often require users to practice operating with NVGs before attempting critical activities.

In addition to optical effects, users often take time to acclimate to the physical presence of NVGs. For example, the NVG forms a mass that is displaced from the center of mass of the user's head. The added mass induces forces on the user that may affect the user's physical movements and balance. Because the combined optical and physical effects can degrade a user's performance significantly, some form of NVG training is often required before the user engages in difficult or dangerous activities.

One approach to training, described in U.S. Pat. No. 5,420,414, replaces an IIT with a fiber rod that transmits light from an external environment to the user. The fiber rod is intended to limit the user's depth perception while allowing the user to view an external environment through separate eyepieces of a modified NVG. The fiber rod system requires the IIT to be removed and does not provide light at the output wavelength of the cathodoluminescent layer. Additionally, the fiber rod system does not appear to provide a way to provide electronically generated images.

An alternative approach to the fiber rod system is to project an electronically generated IR or near-IR image onto a large screen that substantially encircles the user. The user then views the screen through the NVG. This system has several drawbacks, including limiting the user's movement and orientation to locations where the screen is visible through the NVG.

Moreover, typical large screen systems utilize projected light to produce the screen image. One of the simplest and most effective approaches to projecting light onto a large surrounding screen is to locate the projecting source near the center of curvature of the screen. Unfortunately, for such location, the user may interrupt the projected light as the user moves about the artificial environment. To avoid such interruption, the environment may use more than one source or position the light source in a location that is undesirable from an image generation point-of-view.

SUMMARY OF THE INVENTION

According to one embodiment of the invention, a display apparatus includes a night vision goggle and an infrared source. In one embodiment, the infrared source is a scanned light beam display that includes a scanning system and an infrared light emitter. The infrared source receives an image signal from control electronics that indicates an image to be viewed. The control electronics activate the light emitter and the light emitter emits modulated light having an intensity corresponding to the desired image. Simultaneously, a scanning mirror within the scanning system scans the modulated light through a substantially raster pattern onto an image intensifier tube of the night vision goggles.

In response to the incident infrared light, the IIT outputs visible light for viewing by a user. To prevent environmental light from affecting the IIT, the input to the IIT is occluded, in one embodiment.

In one embodiment that includes a scanner, the scanner includes two uniaxial scanners, while in another embodiment, the scanner is a biaxial scanner. In one embodiment, the scanner is a mechanically resonant scanner. The scanner may be a discrete scanner, acousto-optic scanner, microelectromechanical (MEMs) scanner or another type of scanner.

In an alternative embodiment, the scanner is replaced by a liquid crystal display with an infrared back light. The LCD is addressed in conventional fashion according to image data. When a pixel is activated, the pixel transmits the infrared light to the IIT. In response, the IIT outputs visible light to the user.

In another alternative embodiment, the scanner is replaced by an emitter panel of a field emission display. In this embodiment, the IIT photocathode may also be removed. The emitter panel then emits electrons directly to the microchannel accelerator of the NVG. The accelerated electrons activate the cathodoluminescent material of the NVG to produce output light for viewing.

In still another embodiment, a non-visible radiation source, such as an ultraviolet or infrared light source illuminates a phosphor. In response, the phosphor emits light at visible wavelengths. In one embodiment, where the non-visible radiation source is infrared, the wavelength is selected in a region that is determined to be safe for human viewing.

In another embodiment of the invention, a display uses a plurality of non-visible radiation sources, such as laser diodes, to drive wavelength selective phosphor compounds on a screen. Each of the phosphor compounds is responsive to a selected one of the light sources to emit visible light at a respective visible wavelength. An electronic controller modulates each of the non-visible radiation sources according to image information in an image signal, such as a conventional video signal. A scanner then scans the modulated light from all of the light sources in a substantially raster pattern onto the phosphor compounds. In response the phosphor compounds emit light at their respective visible wavelengths with intensities corresponding to the modulated intensity of the corresponding non-visible radiation. Each location on the screen thus emits light with a color and intensity dictated by the image signal, thereby producing a respective pixel of an image.

DETAILED DESCRIPTION OF THE INVENTION

Figure 1:
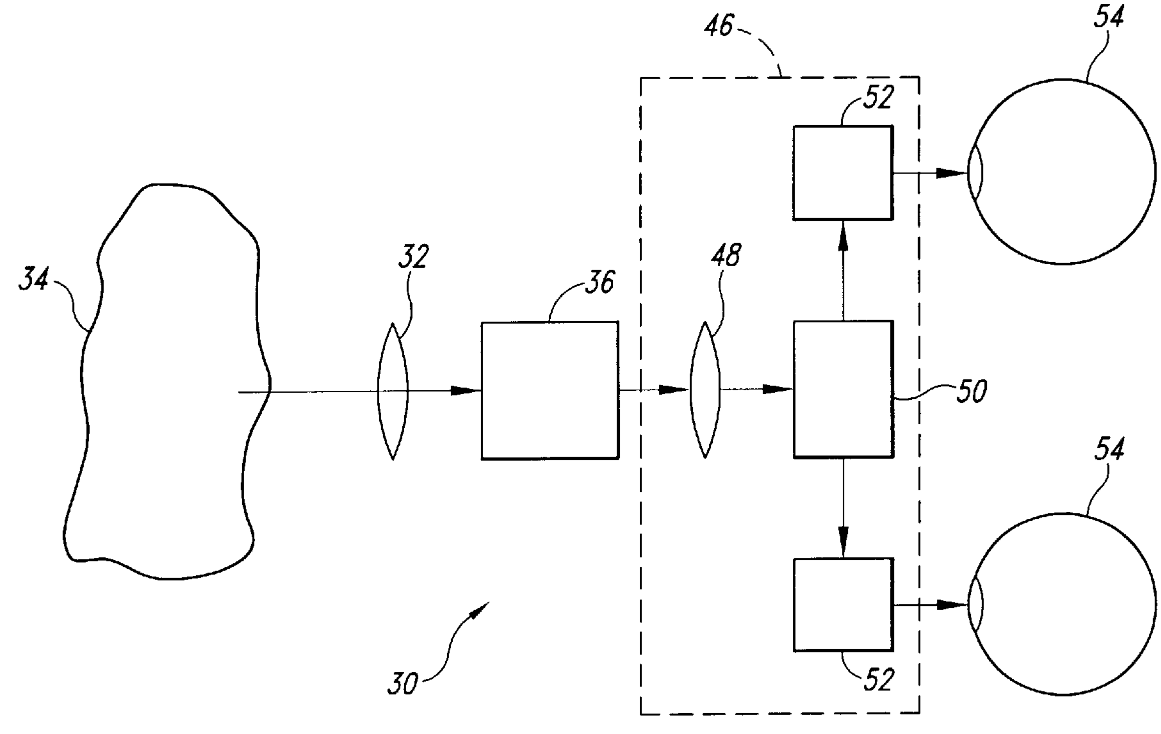
FIG. 1 is a diagrammatic representation of a prior art low light viewer, including an image intensifier tube (IIT) and associated optics.
Figure 2:
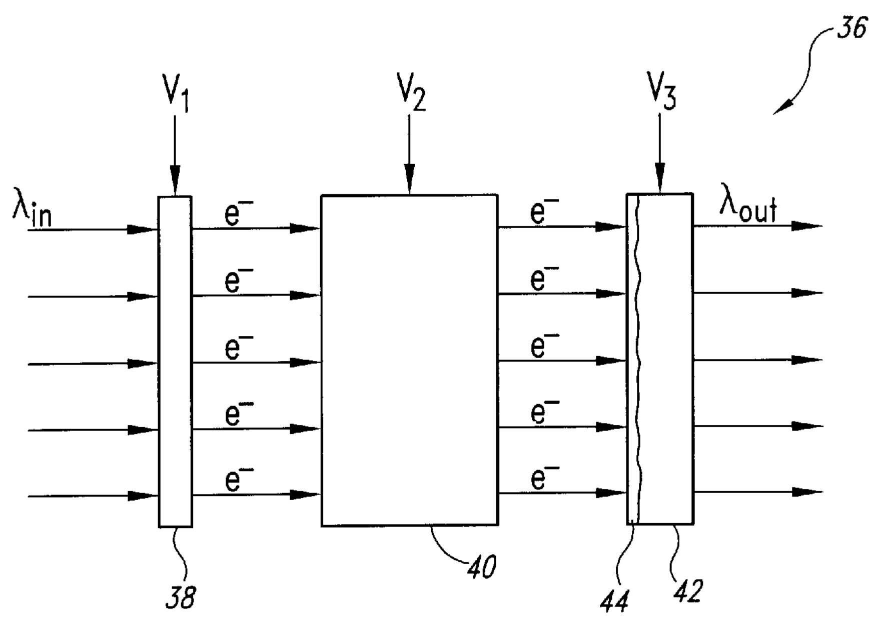
FIG. 2 is a detail block diagram of the IIT of FIG. 1.
Figure 3:
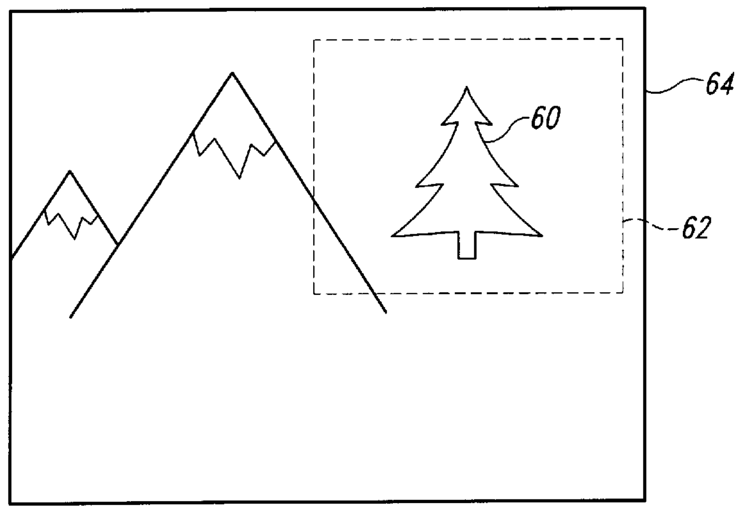
FIG. 3 is a diagram of a combined image perceived by a user resulting from the combination of light from an image source and light from a background.

A variety of techniques are available for providing visual displays of graphical or video images to a user. Recently, very small displays have been developed for partial or augmented view applications. In such applications, the display is positioned to produce an image 60 in a region 62 of a user's field of view 64, as shown in FIG. 3. The user can thus see both a displayed image 66 and background information 68.

One example of a small display is a scanned beam display such as that described in U.S. Pat. No. 5,467,104 of Furness et al., entitled VIRTUAL RETINAL DISPLAY, which is incorporated herein by reference. In scanned displays, a scanner, such as a scanning mirror or acousto-optic scanner, scans a modulated light beam onto a viewer's retina. The scanned light enters the eye through the viewer's pupil and is imaged onto the retina by the cornea. The user perceives an image corresponding to the modulated light image onto the retina. Other examples of small displays include miniature liquid crystal displays (LCDs), field emission displays (FEDs), plasma displays and miniature cathode ray tube-based displays (CRTs). Each of these other types of displays is well known in the art.

Figure 4:
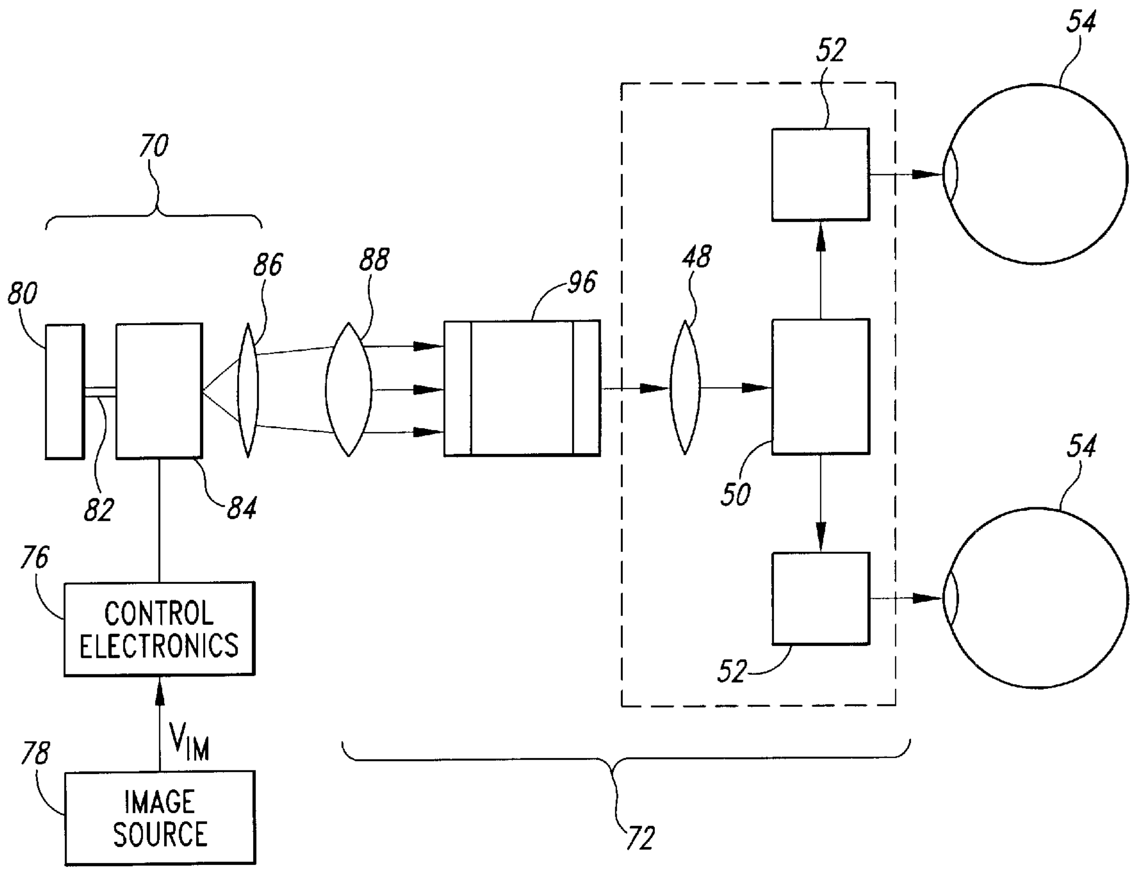
FIG. 4 is a diagrammatic representation of a night vision simulator including an infrared beam scanned onto a night vision goggle input.

As will be described herein, these miniature displays can be adapted to activate light emitting materials to produce visible images at selected wavelengths different from the wavelengths of miniature display. For example, such miniature displays can activate the cathodoluminescent material of NVGs to produce a perceived image that simulates the image perceived when the NVGs are used to view a low light image environment. A first embodiment of such a system, shown in FIG. 4, includes an IR scanned light beam display 70 positioned to scan a beam for input to an NVG 72. Responsive to light from the IR display 70, the NVG 72 outputs visible light for viewing by the viewer's eyes 54. The IR display 70 includes four principal portions, each of which will be described in greater detail below. First, control electronics 76 provide electrical signals that control operation of the display 70 in response to an image signal $V_{IM}$ from an image source 78, such as a computer, television receiver, videocassette player, or similar device. While the block diagram of FIG. 4 shows the image source 78 connected directly to the control electronics 76, one skilled in the art will recognize other approaches to coupling the image signal $V_{IM}$ to the control electronics 76. For example, where the user is intended to move freely, a rf transmitter and receiver can communicate the image signal $V_{IM}$ as will be described below with reference to FIG. 9. Alternatively, where the control electronics 76 are configured for low power consumption, such as in a man wearable computer, the control electronics 76 may be carried by the user and powered by a battery.

The second portion of the display 70 includes a light source 80 that outputs a modulated light beam 82 having a modulation corresponding to information in the image signal $V_{IM}$. The light source 80 may include a directly modulated light emitter such as a laser diode or light emitting diode (LED) or may be include a continuous light emitter indirectly modulated by an external modulator, such as an acousto-optic modulator. While the light source 80 preferably emits IR or near-IR light, other wavelengths may be used for certain applications. For example, in some cases, the NVG 72 may use phosphors having sensitivity at other wavelengths (e.g., visible or ultraviolet). In such cases, the wavelength of the source 80 may be selected to correspond to the phosphor.

The third portion of the display 70 is a scanner assembly 84 that scans the modulated beam 82 of the light source 80 through a two-dimensional scanning pattern, such as a raster pattern. One example of such a scanner assembly is a mechanically resonant scanner, such as that described U.S. Pat. No. 5,557,444 to Melville et al., entitled MINIATURE OPTICAL SCANNER FOR A TWO-AXIS SCANNING SYSTEM, which is incorporated herein by reference. However, other scanning assemblies, such as microelectromechanical (MEMs) scanners and acousto-optic scanners may be within the scope of the invention. A MEMs scanner is preferred in some applications due to its low weight and small size. Such scanners may be uniaxial or biaxial. An example of one such MEMs scanner is described in U.S. Pat. No. 5,629,790 to Neukermans, et al entitled MICROMACHINED TORSIONAL SCANNER, which is incorporated herein by reference. Because the light source 80 and scanner assembly 84 can operate with relatively low power, a portable battery pack can supply the necessary electrical power for the light source 80, the scanner assembly 84 and, in some applications, the control electronics 76.

Imaging optics 86 form the fourth portion of the display 70. While the imaging optics 86 are represented in FIG. 4 as a single lens, one skilled in the art will recognize that the imaging optics 86 may be more complicated, for example when the beam 82 is to be focused or shaped. For example, the imaging optics 86 may include more than one lens or diffractive optical elements. In other cases, the imaging optics may be eliminated completely or may utilize an input lens 88 of the NVG 72. Also, where alternative structures, such as an LCD panel or field emission display structure (as described below with reference to FIGS. 7 and 8), replace the image source 78 and scanner assembly 84, the imaging optics 86 may be modified according to known principles.

The imaging optics 86 output the scanned beam 82 onto the input lens 88 or directly onto an IIT 96 of the NVG 72. The NVG 72 responds to the scanned beam 82 and produces visible light for viewing by the user's eye 54, as described above.

Figure 5:
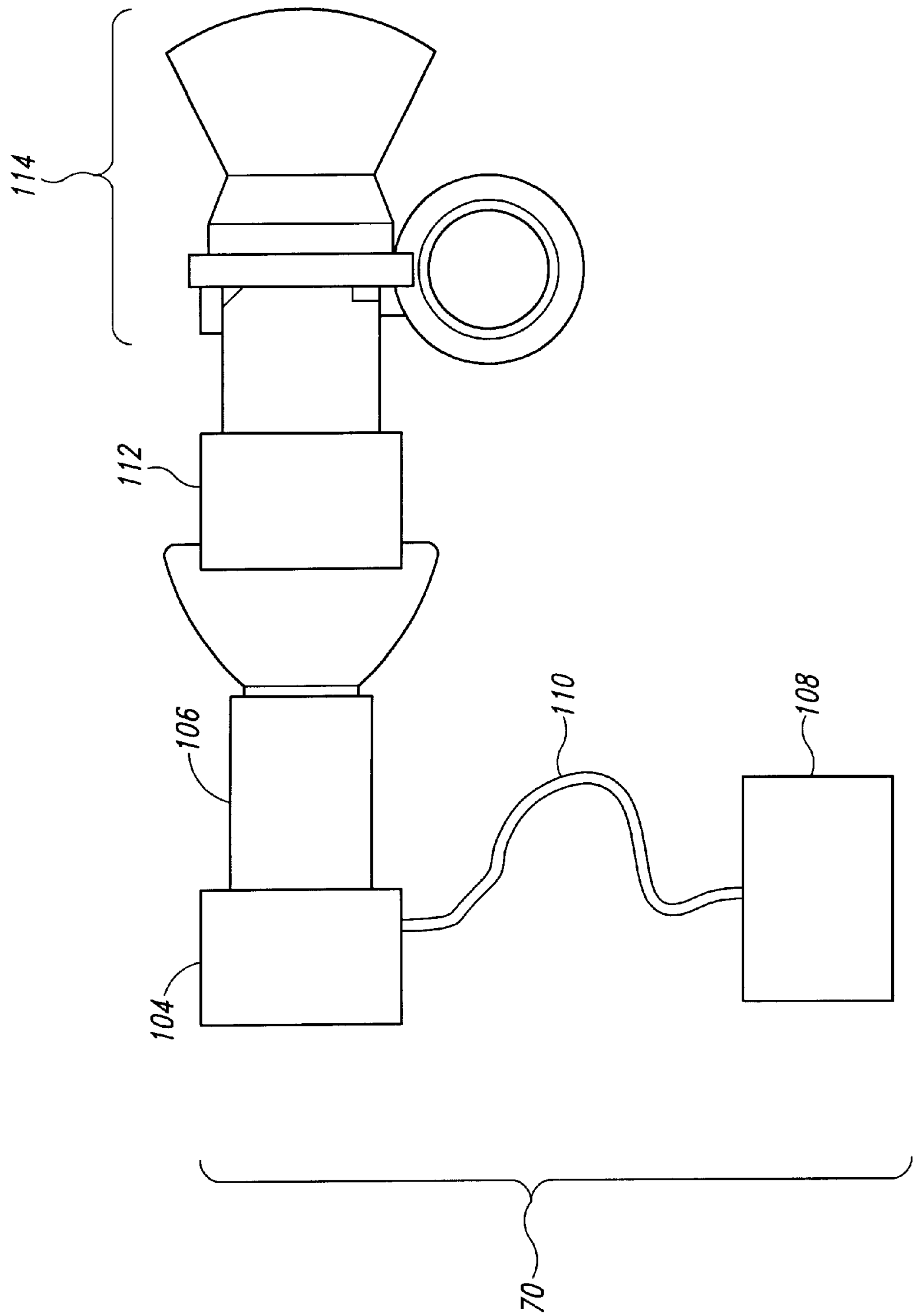
FIG. 5 is a side elevational view of a head-mounted night vision simulator including a tethered IR source.

Although the elements here are presented diagrammatically, one skilled in the art will recognize that the components are typically sized and configured for mounting directly to the NVG 72, as shown in FIG. 5. In this embodiment, a first portion 104 of the display 70 is mounted to a lens frame 106 and a second portion 108 is carried separately, for example in a hip belt. The portions 104, 108 are linked by a fiber optic and electronic tether 110 that carries optical and electronic signals from the second portion 108 to the first portion 104. An example of a fiber-coupled scanning display is found in U.S. Pat. No. 5,596,339 of Furness et. al., entitled VIRTUAL RETINAL DISPLAY WITH FIBER OPTIC POINT SOURCE which is incorporated herein by reference. One skilled in the art will recognize that, in applications where the control electronics 76 (FIG. 3) are small, the light source may be incorporated in the first portion 104 and the tether 110 can be eliminated.

When the first portion 104 is mounted to the lens frame 106, the lens frame 106 couples infrared light from the first portion to the IIT 112. The IIT 112 converts the infrared light to visible light that is presented to a user by the eyepieces 114.

Figure 6:
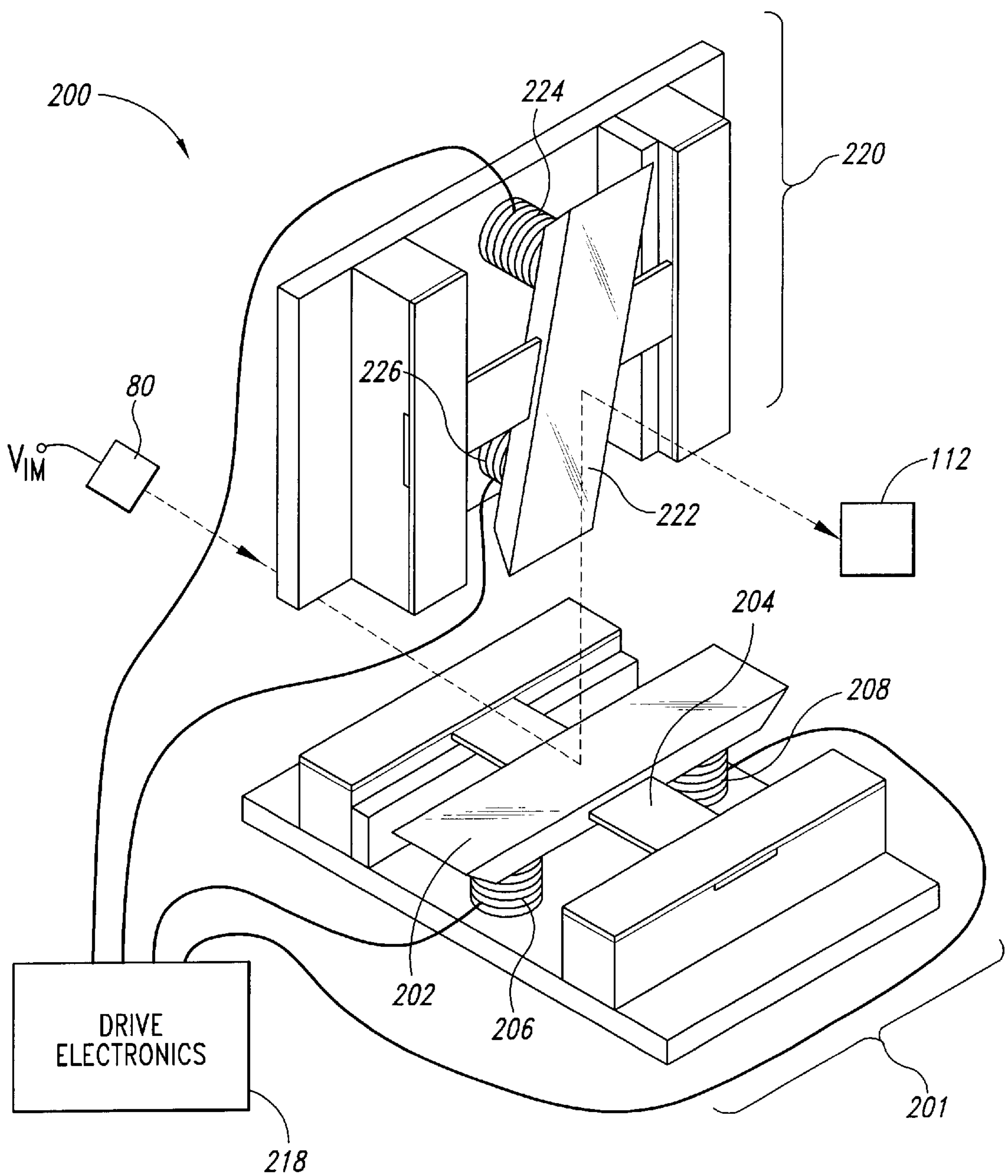
FIG. 6 is a schematic of an IR scanning system suitable for use as the image source in the display of FIG. 2.

FIG. 6 shows one embodiment of a mechanically resonant scanner 200 suitable for use as the scanner assembly 84. The resonant scanner 200 includes as the principal horizontal scanning element, a horizontal scanner 201 that includes a moving mirror 202 mounted to a spring plate 204. The dimensions of the mirror 202 and spring plate 204 and the material properties of the spring plate 204 are selected so that the mirror 202 and spring plate 204 have a natural oscillatory frequency on the order of 1–100 kHz. A ferromagnetic material mounted with the mirror 202 is driven by a pair of electromagnetic coils 206, 208 to provide motive force to mirror 202, thereby initiating and sustaining oscillation. Drive electronics 218 provide electrical signal to activate the coils 206, 208.

Vertical scanning is provided by a vertical scanner 220 structured very similarly to the horizontal scanner 201. Like the horizontal scanner 201, the vertical scanner 220 includes a mirror 222 driven by a pair of coils 224, 226 in response to electrical signals from the drive electronics 218. However, because the rate of oscillation is much lower for vertical scanning, the vertical scanner 220 is typically not resonant. The mirror 222 receives light from the horizontal scanner 201 and produces vertical deflection at about 30–100 Hz. Advantageously, the lower frequency allows the mirror 222 to be significantly larger than the mirror 202, thereby reducing constraints on the positioning of the vertical scanner 220. The details of virtual retinal displays and mechanical resonant scanning are described in greater detail in U.S. Pat. No. 5,557,444 of Melville, et al., entitled MINIATURE OPTICAL SCANNER FOR A TWO AXIS SCANNING SYSTEM which is incorporated herein by reference.

Alternatively, the vertical mirror may be mounted to a pivoting shaft and driven by an inductive coil. Such scanning assemblies are commonly used in bar code scanners. As will be discussed below, the vertical and horizontal scanner can be combined into a single biaxial scanner in some applications.

In operation, the light source 80, driven by the image source 78 (FIG. 4) outputs a beam of light that is modulated according to the image signal. At the same time, the drive electronics 218 activate the coils 206, 208, 224, 226 to oscillate the mirrors 202, 222. The modulated beam of light strikes the oscillating horizontal mirror 202, and is deflected horizontally by an angle corresponding to the instantaneous angle of the mirror 202. The deflected light then strikes the vertical mirror 222 and is deflected at a vertical angle corresponding to the instantaneous angle of the vertical mirror 222. The modulation of the optical beam is synchronized with the horizontal and vertical scans so that at each position of the mirrors, the beam color and intensity correspond to a desired image. The beam therefore "draws" the virtual image directly upon the IIT 112 (FIG. 4). One skilled in the art will recognize that several components of the scanner 200 have been omitted for clarity of presentation. For example, the vertical and horizontal scanners 201, 220 are typically mounted in fixed relative positions to a frame. Additionally, the scanner 200 typically includes one or more turning mirrors that direct the beam such that the beam strikes each of the mirrors 202, 222 at the appropriate angle. For instance, the turning mirror may direct the beam so that the beam strikes one or both of the mirrors 202, 222 a plurality of times to increase the effective angular range of optical scanning.

Figure 7:
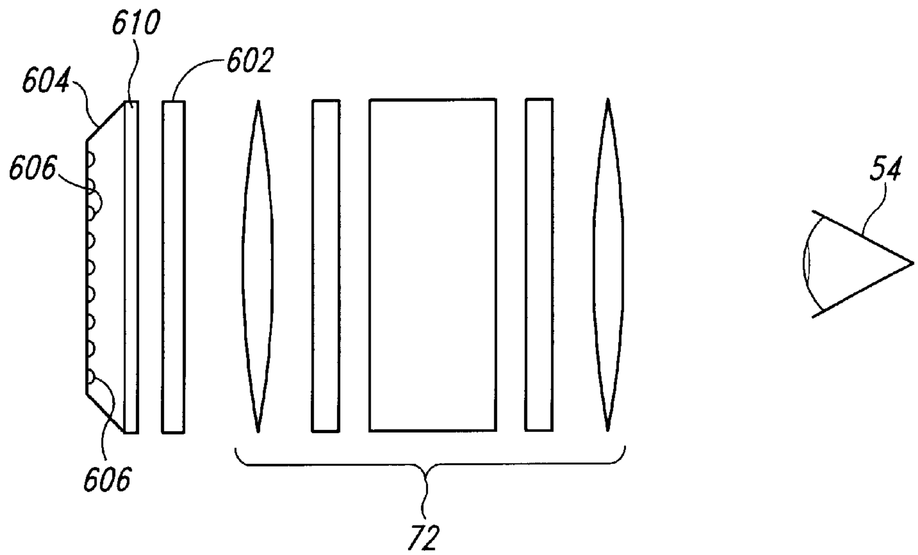
FIG. 7 is a diagrammatic view of an embodiment of a simulator including a LCD panel with an infrared back light.

One skilled in the art will recognize that a variety of other image sources, such as LCD panels and field emission displays, may be adapted for use in place of the scanner assembly 84 and light source 80. For example, as shown in FIG. 7, an alternative embodiment of an NVG simulator 600 is formed from a LCD panel 602, an IR back light 604, and the NVG 72. The IR back light 604 is formed from an array of IR sources 606, such as LEDs or laser diodes, a backreflector 608 and a diffuser 610. One skilled in the art will recognize a number of other structures that can provide infrared or other light for spatial modulation by the LCD panel.

The LCD panel 602 is structured similarly to conventional polarization-based LCD panels, except that the characteristics of the liquid crystals and polarizers are adjusted for response at IR wavelengths. The LCD panel 602 is addressed in a conventional manner to activate each location in a two-dimensional array. At locations where the image is intended to include IR light, the LCD panel selectively passes the IR light from the back light 604 to the NVG 72. The NVG 72 responds as described above by emitting visible light for viewing by the user's eye 54.

Figure 8:
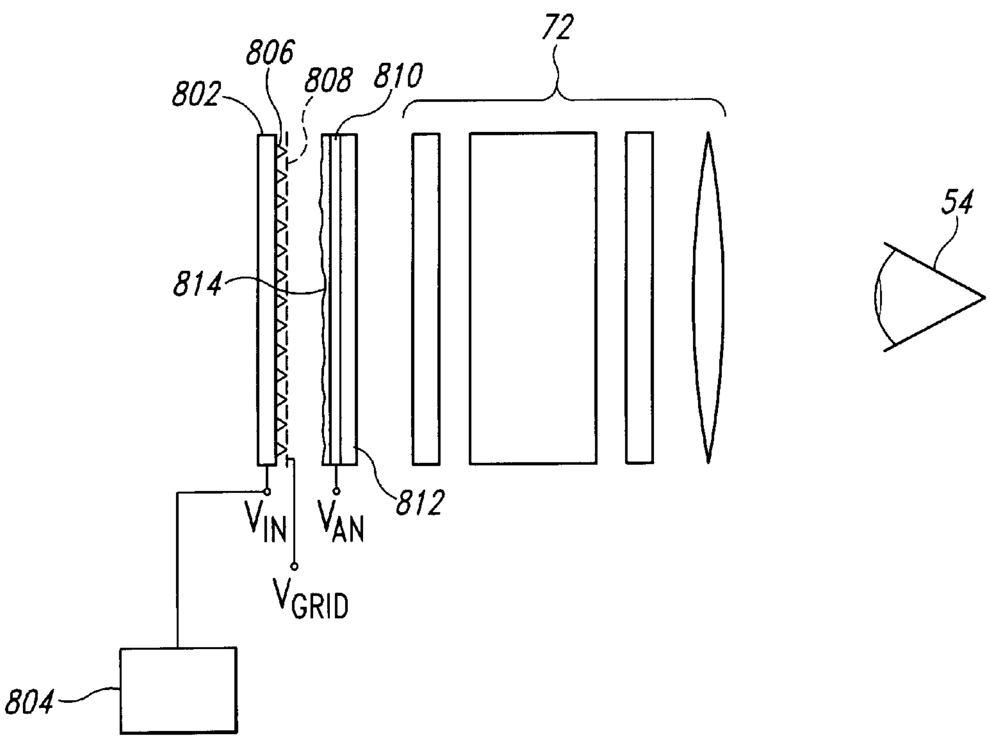
FIG. 8 is a diagrammatic view of an embodiment of a simulator including an FED emitter.

As shown in FIG. 8, another embodiment according to the invention utilizes a field emission display structure to provide an input to the NVG 72. In this embodiment, an emitter panel 802 receives control signals from FED drive electronics 804 and emits electrons in response. The emitter panel 802 may be any known emitter panel, such as those used in commercially available field emission displays. In the typical emitter panel configuration shown in FIG. 8, the emitter panel 802 is formed from an array of emitter sets 806 aligned to an extraction grid 808. The emitter sets 806 typically are a group of one or more commonly connected emissive discontinuities or "tips" that emit electrons when subjected to high electric fields. The extraction grid 808 is a conductive grid of one or more conductors. When the drive electronics 804 induce a voltage difference between an emitter set 806 and a surrounding region of the extraction grid 808, the emitter set 806 emits electrons. By selectively controlling the voltage between each emitter set 806 and the surrounding region of the grid 808, the drive electronics 804 can control the location and rate of electrons being emitted.

A high voltage anode 810 carried by a transparent plate 812 attracts the emitted electrons. As the electrons travel to the plate 812 they strike a cathodoluminescent coating 814 that covers the anode 810. In response, the cathodoluminescent coating 814 emits infrared light in the impacted region with an intensity that corresponds to the rate at which electrons strike the region. The infrared light passes through the plate 812 and enters the NVG 72. Because the drive electronics 804 establish the rate and location of the emitted electrons according to the image signal, the infrared light also corresponds to the image signal. As before, the NVG 72 emits visible light responsive to the infrared light for viewing by the user's eye 54.

Figure 9:
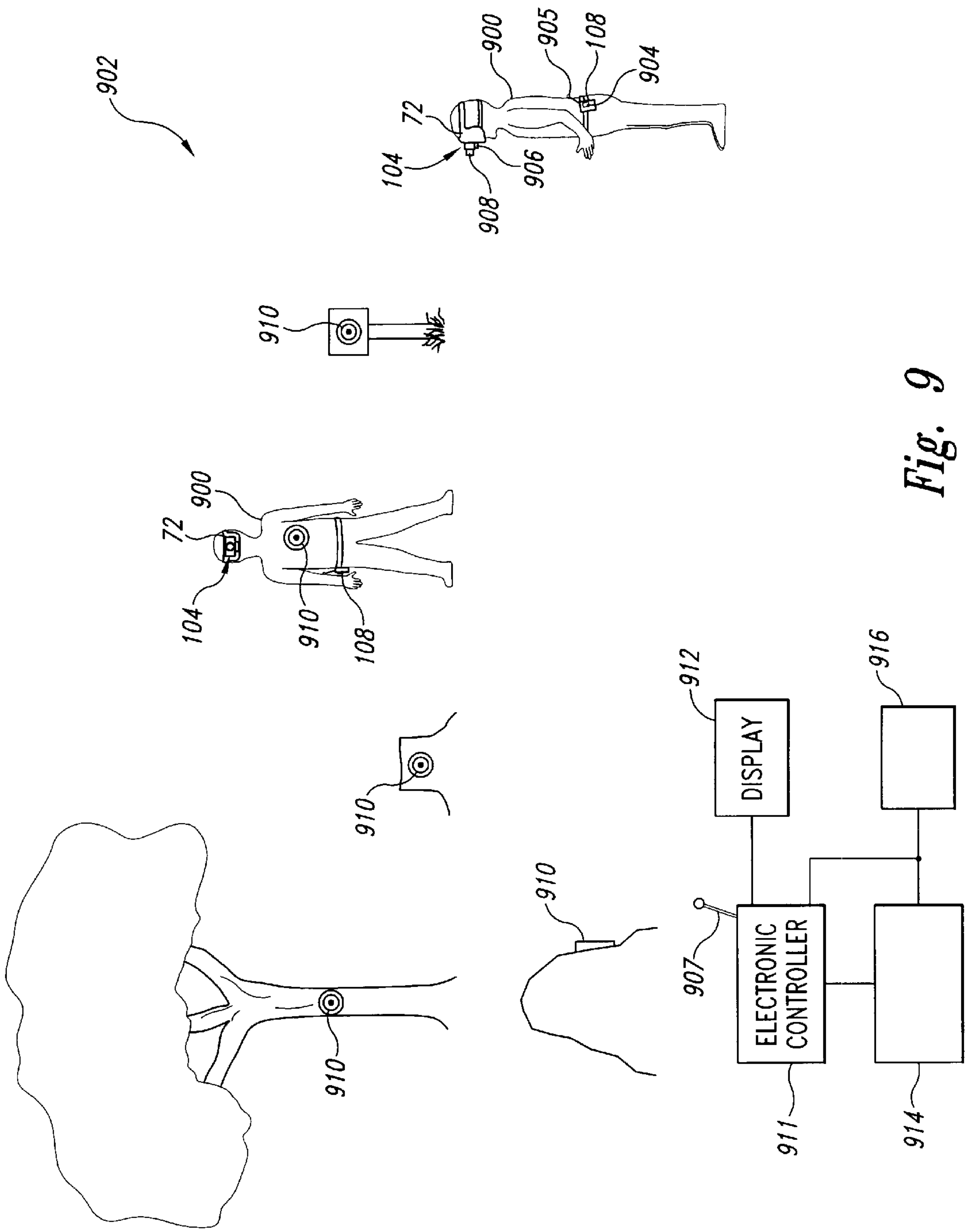
FIG. 9 is a top plan view of a simulation environment including a plurality of users and a central control system including a computer controller and rf links.

As shown in FIG. 9, human participants 900 may use the display 70 of FIG. 5 in a simulation environment 902 that permits substantially unbounded movement. In this embodiment, the participants 900 carry the display 70 with the second portion 108 secured around the waist and the first portion 104 mounted to a head-borne NVG 72. The first portion 104 additionally includes a position monitor 906 and a gaze tracker 908 that identify the participant's positions in the environment and the orientation of the user's gaze.

One skilled in the art will recognize a number of realizable position trackers, such as acoustic sensors and optical sensors. Moreover, although the position monitor 906 is shown as being carried by the participant 900, the position monitor 906 may alternatively be fixedly positioned in or around the environment or may include a mobile portion and a fixed portion. Similarly, a variety of gaze tracking structures may be utilized. In the embodiment of FIG. 9, the gaze tracker utilizes a plurality of fiducial reflectors 910 positioned throughout the environment 902 or on the participants 900. To detect position, the gaze tracker 908 emits one or more IR beams outwardly into the environment 902. The IR beams may be generated by the image source 78, or from separate IR sources mounted to the first portion 104. The emitted IR beams strike the fiducial 910 and are reflected. Because each of the fiducials 910 has a distinct, identifiable pattern of spatial reflectivity, the reflected light is modulated in a pattern corresponding to the particular fiducial 910. A detector mounted to the first portion 104 receives the reflected light and produces an electrical signal indicative of the reflective pattern of the fiducial 910. The tether 110 carries the electrical signal to the second portion 108.

The second portion 108 includes an rf transceiver 904 with a mobile antenna 905 that transmits data corresponding to the detected reflected light and status information to an electronic controller 911. The electronic controller 911 is a microprocessor-based system that determines the desired image under control of a software program. The controller 911 receives information about the participants' locations, status, and gaze directions from the transceivers 904 through a base antenna 907. In response, the controller 911 identifies appropriate image data and transmits the image data to the transceiver 904. The second portion 108 then provides signals to the first portion 104 through the tether, causing the scanner assembly 84 and image source 78 to provide IR input to the NVG 72. The participants 900 thus perceive images through the NVG 72 that correspond to the participants' position and gaze direction.

To allow external monitoring of activity in the environment, a display 912 coupled to the electronic controller 911 presents images of the environment, as viewed by the participants 900. A scenario input device 914, such as a CD-ROM, magnetic disk, video tape player or similar device, and a data input device 916, such as a keyboard or voice recognition module, allow the action within the environment 902 to be controlled and modified as desired.

Although the embodiments herein are described as using scanned infrared light, the invention is not necessarily so limited. For example, in some cases it may be desirable to scan ultraviolet or visible light onto a photonically activated screen. Ultraviolet light scanning may be particularly useful for scanning conventional visible phosphors, such as those found in common fluorescent lamps or for scanning known up-converting phosphors.

Figure 10:
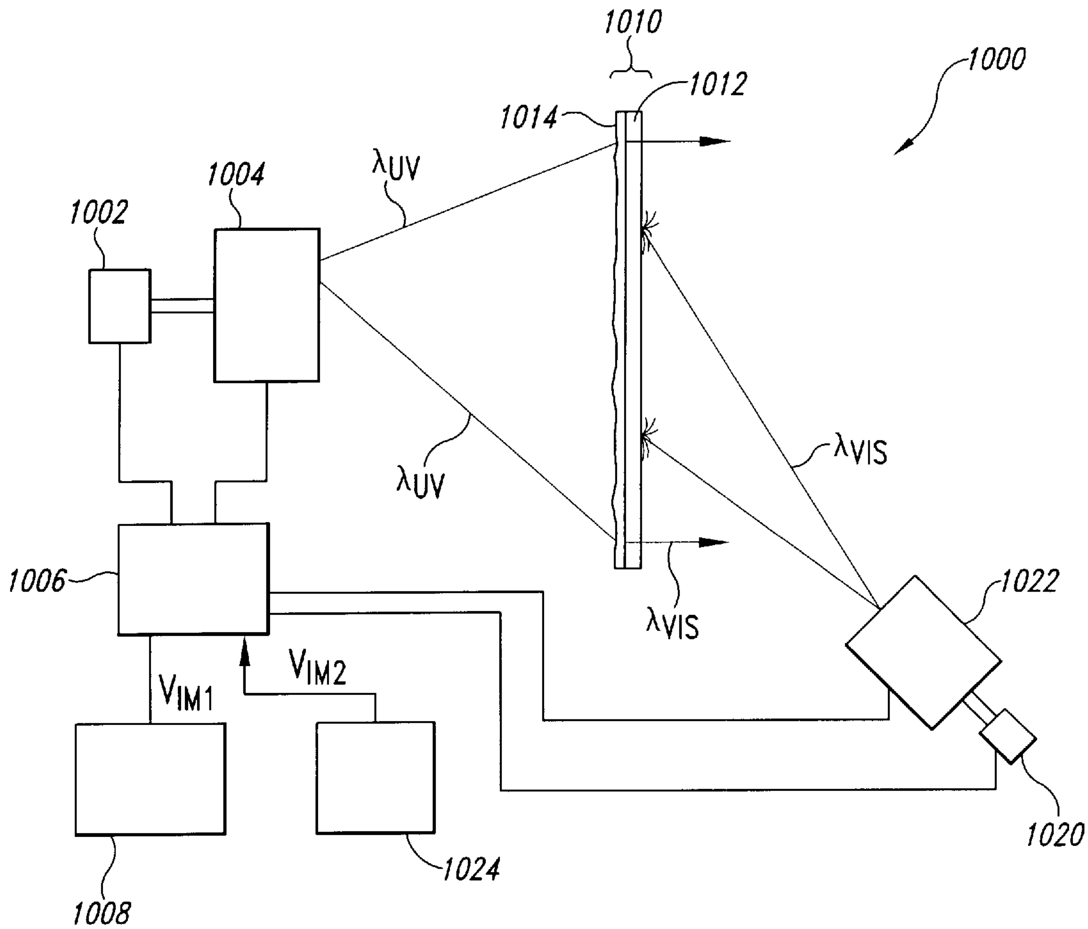
FIG. 10 is a diagrammatic view of an embodiment of a display including a scanned light beam activating a wavelength converting phosphor and a reflected visible beam.

An example of such a structure is shown in FIG. 10 where a scanned beam display 1000 is formed from a UV light source 1002 aligned to a scanner assembly 1004. The UV source 1002 may be a discrete laser, laser diode or LED that emits UV light.

Control electronics 1006 drive the scanner assembly 1004 through a substantially raster pattern. Additionally, the control electronics 1006 activate the UV source 1002 responsive to an image signal from an image input device 1008, such as a computer, rf receiver, FLIR sensor, videocassette recorder, or other conventional device.

The scanner assembly 1004 is positioned to scan the UV light from the UV source 1002 onto a screen 1010 formed from a glass or plexiglas plate 1012 coated by a phosphor layer 1014. Responsive to the incident UV light, the phosphor layer 1014 emits light at a wavelength visible to the human eye. The intensity of the visible light will correspond to the intensity of the incident IN light, which will in turn, correspond to the image signal. The viewer thus perceives a visible image corresponding to the image signal. One skilled in the art will recognize that the screen 1010 effectively acts as an exit pupil expander that eases capture of the image by the user's eye, because the phosphor layer 1014 emits light over a large range of angles, thereby increasing the effective numerical aperture.

In addition to the scanned UV source, the embodiment of FIG. 10 also includes a visible light source 1020, such as a red laser diode, and a second scanner assembly 1022. The control electronics 1006 control the second scanner assembly 1022 and the visible light source 1020 in response to a second image signal from a second image input device 1024.

In response to the control electronics, the second scanner assembly 1022 scans the visible light onto the screen 1010. However, the phosphor is selected so that it does not emit light of a different wavelength in response to the visible light. Instead, the phosphor layer 1014 and the plate 1012 are structured to diffuse the visible light. The phosphor layer 1014 and plate 1012 thus operate in much the same way as a commercially available diffuser, allowing the viewer to see the red image corresponding to the second image signal.

In operation, the UV and visible light sources 1002, 1020 can be activated independently to produce two separate images that may be superimposed. For example, in an aircraft the UV source 1002 can present various data or text from a sensor, such as an altimeter, while the visible source 1020 can be activated to display FLIR warnings.

Although the display of FIG. 10 is presented as including two separate scanner assemblies 1004, 1022, one skilled in the art will recognize that by aligning both sources to the same scanner assembly, a single scanner assembly can scan both the UV light and the visible light. One skilled in the art will also recognize that the invention is not limited to UV and visible light. For example, the light sources 1002, 1020 may be two infrared sources if an infrared phosphor or other IR sensitive component is used. Alternatively, the light sources 1002, 1020 may include an infrared and a visible source or an infrared source and a UV source.

Figure 11:
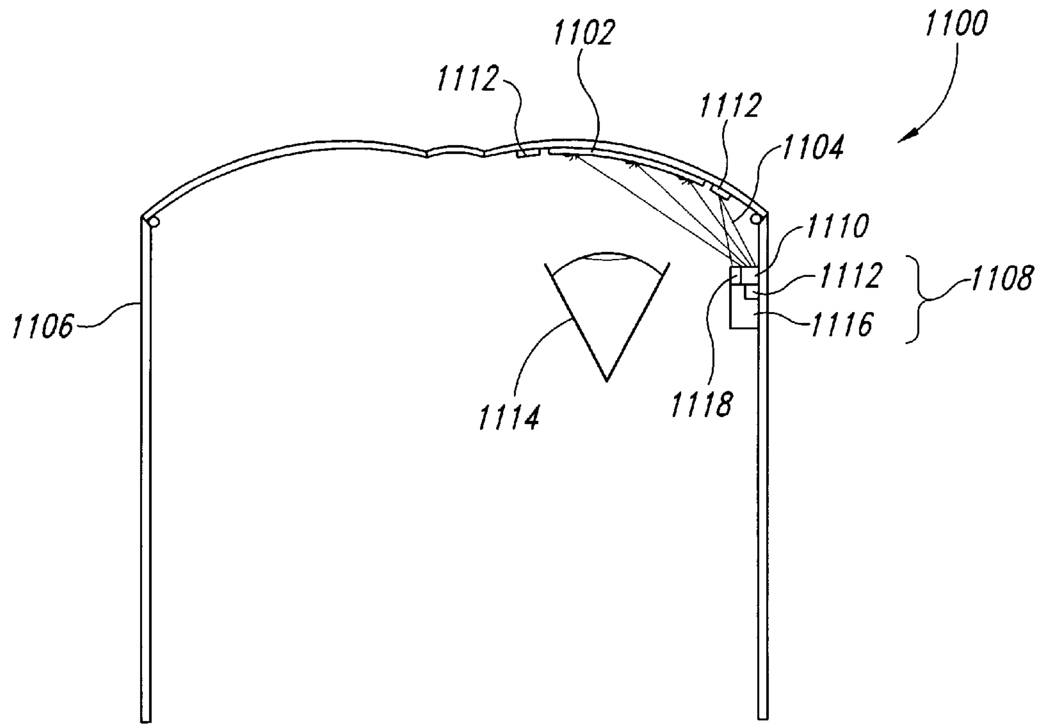
FIG. 11 is a diagrammatic representation of an embodiment of a head mounted display including a scanned non-visible radiation beam activating a wavelength converting phosphor to produce a visible image.

Scanning light of a first wavelength onto a wavelength converting medium, such as a phosphor, is not limited to night vision applications. For example, as shown in FIG. 11, a scanned light beam head mounted display (HMD) 1100 includes a phosphor plate 1102 activated by a scanned light beam 1104 to produce a viewing image for a user. The HMD 1100 may be used as a general purpose display, rather than as a night vision aid.

In this embodiment, the HMD 1100 includes a frame 1106 that is configured similarly to conventional glasses so that a user may wear the HMD 1100 comfortably. The frame 1106 supports the phosphor plate 1102 and an image source 1108 in relative alignment so that the light beam strikes the phosphor plate 1102. The image source 1108 includes a directly modulated laser diode 1112 and a small scanner 1110, such as a MEMs scanner, that operate under control of an electronic control module 1116. The laser diode 1112 preferably emits non-visible radiation such as an infrared or ultraviolet light. However, other wavelengths, such as red or near-UV may be used in some applications.

The scanner 1110 is a biaxial scanner that receives the light from the diode 1112 and redirects the light through a substantially raster pattern onto the phosphor plate 1102. Responsive to the scanned beam 1104, the phosphor on the phosphor plate 1102 emits light at visible wavelengths. The visible light travels to the user's eye 1114 and the user sees an image corresponding to the modulation of the scanned beam 1104.

Figure 12:
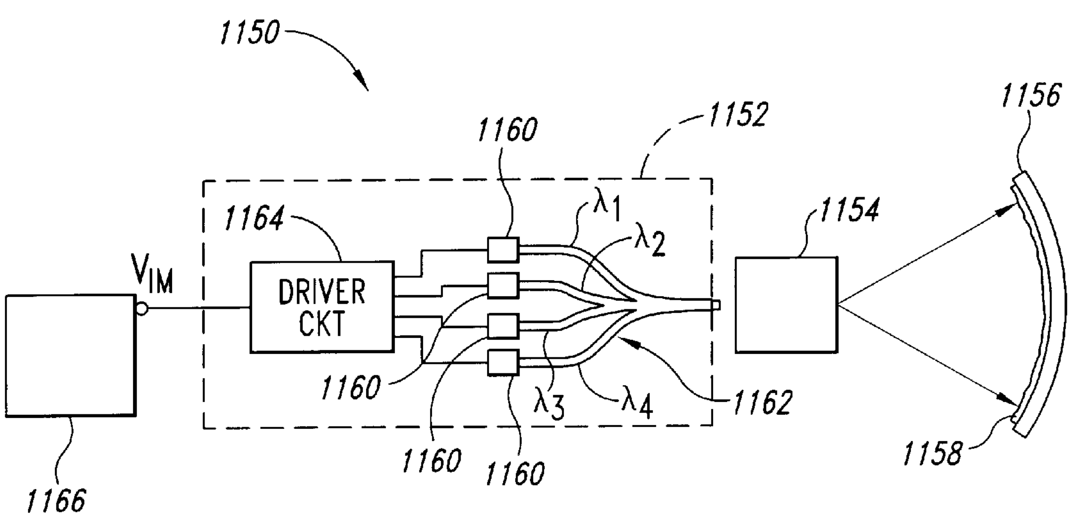
FIG. 12 is a diagrammatic view of a color display system using non-visible radiation sources at a plurality of wavelengths to selectively activate wavelength selective phosphors.

The image may be color or monochrome, depending upon patterning of the phosphor plate. For a color display, the phosphor plate 1102 may include interstitially located lines, each containing a respective phosphor formulated to emit light at a red, green or blue wavelength, as shown in FIG. 12. The control module 1116 controls the relative intensity of the scanned light beam for each location to produce the appropriate levels of red, green and blue for the respective pixel.

To maintain synchronization of the light beam modulation with the lateral position, the HMD 1100 uses an active feedback control with one or more sensor high-speed photodiodes 1118 mounted adjacent to the scanner 1110. Small reflectors 1120 mounted to the phosphor plate 1102 reflect an end portion of the scanned beam 1104 back to the photodiodes 1118 at the end of each horizontal scan. Responsive to the reflected light, the photodiodes 1118 provide an electrical error signal to the control module 1116 indicative of the phase relationship between the beam position and the beam modulation. In response, the control module 1116 adjusts the timing of the image data to insure that the diode 1112 is modulated appropriately for each scanning location.

An alternative approach to producing multicolor images with a phosphor is presented in FIG. 12. The display 1150 of FIG. 12 includes a multi-wavelength source 1152 that provides light input to a scanner 1154. The scanner 1154, in turn, scans the light onto a screen 1156 coated with a wavelength-selective phosphor layer 1158.

The multi-wavelength source 1152 is formed from four IR laser diodes 1160 that emit light at slightly different wavelengths. For example, in one application, the laser diodes 1160 emit light at wavelengths ranging from 900–1600 nm. Each of the laser diodes 1160 is driven independently by a driver circuit 1164 in response to selected components of an input image signal $V_{IM}$ from a signal source 1166 such as a television receiver, computer, videocassette receiver, aircraft control system, or other type of image source. The driver circuit 1164 extracts selected components, such as RGB components, of the image signal $V_{IM}$ and provides corresponding electrical signals to the respective laser diodes 1160. In response to its respective electrical signal, each laser diode 1160 emits infrared light at a corresponding intensity level.

A beam combiner 1162 combines the light from the laser diodes 1160 to produce a single beam that includes intensity-modulated light at four different wavelengths $\lambda_1$–$\lambda_4$. The scanner 1154 raster scans the combined beam onto the screen 1156.

The combined beam strikes the phosphor layer 1158 causing light to be emitted at each location. The phosphor layer 1158 includes a plurality of wavelength selective phosphor combinations, where each phosphor combination is responsive to a respective one of the wavelengths $\lambda_1$–$\lambda_4$ to emit light at a respective visible wavelength. Such phosphors have been demonstrated by SRI and are available from SRI and Kodak. For example, a first of the phosphor combinations emits green light in response to light at the first IR wavelength $\lambda_1$. The intensity of the green light corresponds to the intensity of the light at the first IR wavelength $\lambda_1$, which corresponds, in turn to a green component of the image signal $V_{IM}$. Because the IR light at the various wavelengths is scanned simultaneously and because the visible colors depend upon the intensity of respective wavelength components rather than the position of the beam, the alignment issues described with respect to the embodiment of FIG. 11 are reduced significantly.

While this embodiment has been described as including four independent laser diodes 1160, the invention is not so limited. For example, other infrared sources, such as LEDs may be adequate for some applications. Similarly, the number of laser diodes 1160 may be fewer or greater than four. In a typical RGB system, the number of laser diodes 1160 would typically be three; however, other numbers may be appropriate depending upon the spectral or other responses of the phosphor combinations, and upon the desired information content of the displayed image. Moreover, although the beam combiner 1162 is presented as a 4-to-1-fiber combiner, other beam combiners, such as free space optical elements, integrated optical components, or polymeric waveguides may be used. In some applications light modulators, such as interferometric modulators, may be incorporated into the beam combiner 1162 so that the laser diodes may be driven at constant intensities. Additionally, although the exemplary embodiment includes a single scanner 1154 that scans light of all three wavelengths, the invention is not so limited. In some applications, more than one scanner 1154 may be used.

Figure 13:
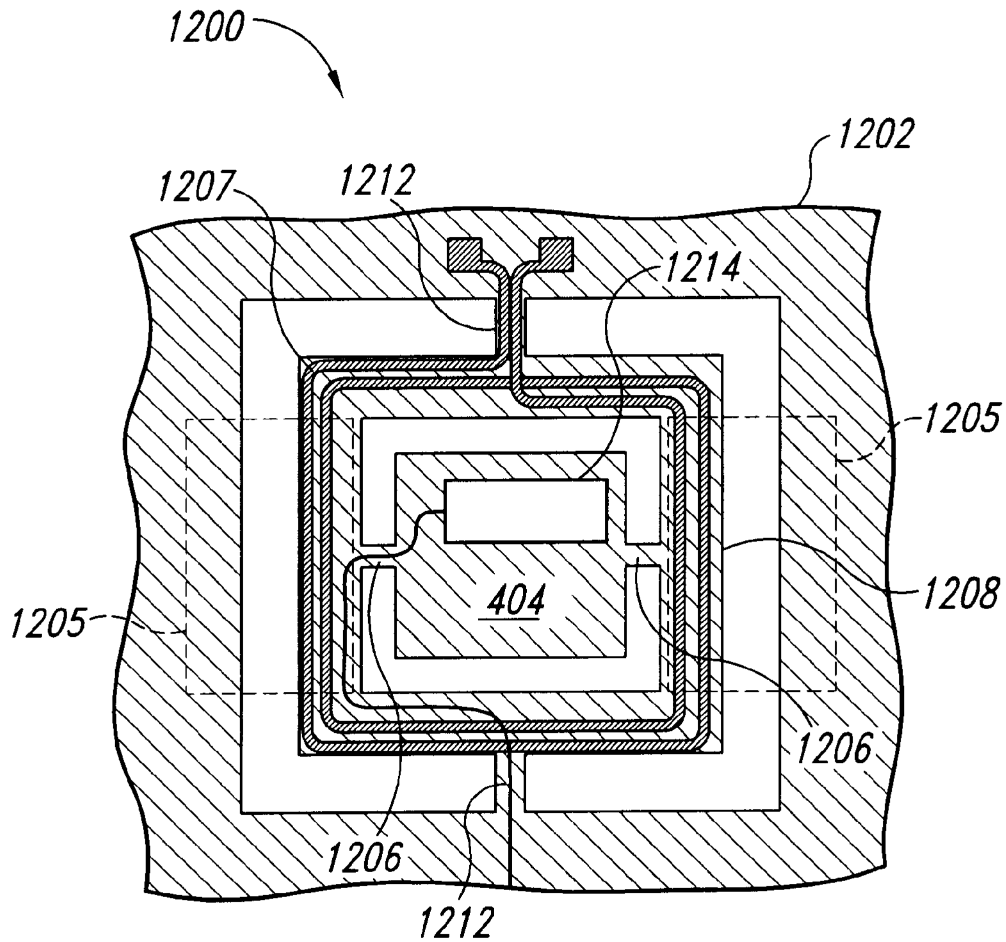
FIG. 13 is a top plan view of a bi-axial MEMS scanner for use in the display of FIG. 4.

To reduce the size and weight of the first portion 104, it is desirable to reduce the size and weight of the scanning assembly 58. One approach to reducing the size and weight is to replace the mechanical resonant scanners 200, 220 with a microelectromechanical (MEMS) scanner, such as that described in U.S. Pat. No. 5,629,790 entitled MICROMACHINED TORSIONAL SCANNER to Neukermans et al and U.S. Pat. No. 5,648,618 entitled MICROMACHINED HINGE HAVING AN INTEGRAL TORSION SENSOR to Neukermans et. al, each of which is incorporated herein by reference. As described therein and shown in FIG. 13, a bi-axial scanner 1200 is formed in a silicon substrate 1202. The bi-axial scanner 1200 includes a mirror 1204 supported by opposed flexures 1206 that link the mirror 1204 to a pivotable support 1208. The flexures 1206 are dimensioned to twist torsionally thereby allowing the mirror 1204 to pivot about an axis defined by the flexures 1206, relative to the support 1208. In one embodiment, pivoting of the mirror 1204 defines horizontal scans of the scanner 1200.

A second pair of opposed flexures 1212 couple the support 1208 to the substrate 1202. The flexures 1210 are dimensioned to flex torsionally, thereby allowing the support 1208 to pivot relative to the substrate 1202. Preferably, the mass and dimensions of the mirror 1204, support 1208, and flexures 1210 are selected such that the mirror resonates, at 10–40 kHz horizontally with a high Q and such that the support 1208 pivots at higher than 60 Hz.

In a preferred embodiment, the mirror 1204 is pivoted by applying an electric field between a plate 1214 on the mirror 1204 and a conductor on a base (not shown). This approach is termed capacitive drive, because of the plate 1214 acts as one plate of a capacitor and the conductor in the base acts as a second plate. As the voltage between plates increases, the electric field exerts a force on the mirror 1204 causing the mirror 1204 to pivot about the flexures 1206. By periodically varying the voltage applied to the plates, the mirror 1204 can be made to scan periodically. Preferably, the voltage is varied at the mechanically resonant frequency of the mirror 1204 so that the mirror 1204 will oscillate with little power consumption.

The support 1208 is pivoted magnetically depending upon the requirements of a particular application. Fixed magnets 1205 are positioned around the support 1208 and conductive traces 1207 on the support 1208 carry current. Varying the current varies the magnetic force on support and produces movement. Preferably, the support 1208 and flexures 1212 are dimensioned so that the support 1208 can respond at frequencies well above a desired refresh rate, such as 60 Hz. One skilled in the art will recognize that capacitive or electromagnetic drive can be applied to pivot either or both of the mirror 1204 and support 1208 and that other drive mechanisms, such as piezoelectric drive may be adapted to pivot the mirror 1204 or support 1208.

Although the invention has been described herein by way of exemplary embodiments, variations in the structures and methods described herein may be made without departing from the spirit and scope of the invention. For example, the positioning of the various components may be varied. In one example of repositioning, the UV source 1002 and visible sources 1020 may be positioned on opposite sides of the screen 1010. Moreover, although the horizontal scanner 200 is described herein as preferably being mechanically resonant at the scanning frequency, in some applications the scanner 200 may be non-resonant. For example, where the scanner 200 is used for "stroke" or "calligraphic" scanning, a non-resonant scanner would be preferred. Further, although the input signal is described as coming from an electronic controller or predetermined image input, one skilled in the art will recognize that a portable video camera (alone or combined with the electronic controller) may provide the image signal. This configuration would be particularly useful in simulation environments involving a large number of participants, since each participant's video camera could provide an image input locally, thereby reducing the complexity of the control system. Accordingly, the invention is not limited except as by the appended claims.

What is claimed is:

1. A display device that produces a visible image in response to an input image signal having a plurality of components, comprising:

a screen, including a base plate and a wavelength converting coating responsive to output light of a first visible wavelength range in response to light of a first input wavelength, and responsive to output light of a second visible wavelength range in response to light of a second input wavelength;

a first light emitter operative to emit a first modulated beam of light of the first input wavelength in response to a first component of the image signal;

a second light emitter operative to emit a second modulated beam of light of the second input wavelength in response to a second component of the image signal; and a scanner assembly having an input aligned optically to receive the first and second modulated beams of light from the first and second light sources and an output aligned optically to direct the beams received at the input to the screen, the scanner assembly being responsive to a driving signal to scan the received beams onto the wavelength converting coating in a periodic pattern; and wherein the wavelength converting coating includes a first infrared sensitive phosphor compound and the first input wavelength is an infrared wavelength.

2. The display of claim 1 wherein the first input wavelength is a non-visible wavelength.

3. The display of claim 2 wherein the second input wavelength is a non-visible wavelength.

4. The display of claim 1 wherein the scanner assembly includes a mirror mounted for pivotal movement about an axis of rotation.

5. The display of claim 1 wherein the scanner assembly includes a microelectromechanical scanner having a mirror positioned to deflect the light received at the input.

6. The display of claim 1 wherein the light source includes a second ultraviolet laser.

7. The display of claim 1 wherein the wavelength converting coating includes a second infrared sensitive phosphor compound responsive to the second input wavelength.

8. The display of claim 1 wherein first light source includes a first laser diode.

9. The display of claim 8 wherein first light source includes an external modulator.

10. The display of claim 8 wherein second light source includes a second laser diode.

11. The display of claim 1 further including a beam combiner interposed between the scanner assembly and the first and second light sources, the beam combiner having a first input aligned to the first light source, a second input aligned to the second light source, and a combiner output aligned to the scanner assembly, the combiner being responsive to produce a single combined beam from the first and second modulated beams of light.

12. The display of claim 1 wherein the second input wavelength is different than the first input wavelength.

13. A head mounted display, comprising:

an image signal source that produces an image signal corresponding to a desired image;

a screen having a wavelength converting coating, the coating being responsive to non-visible radiation to emit visible light wherein the wavelength converting coating is responsive to light in the first wavelength range to emit visible light of a first color and responsive to a light in the second wavelength range to emit visible light of a second color different from the first color;

a light source responsive to the image signal to emit non-visible radiation modulated according to the image signal, the light source including a first light emitter of a first wavelength and a second light emitter of a second wavelength;

a scanner positioned to receive the modulated light and operative to scan the received light onto the screen in a periodic pattern; and wherein the wavelength converting coating, includes a plurality of phosphor combinations, each of the phosphor combinations being responsive to non-visible light of a respective wavelength to emit light of a respective visible wavelength.

14. The display of claim 13 wherein the light source includes a first infrared laser.

15. The display of claim 14 wherein the light source includes a second infrared laser.

16. The display of claim 13 wherein the light source includes a first ultraviolet laser.

17. The display of claim 13 wherein the scanner is a MEMs scanner.

18. The display of claim 13 wherein the scanner includes a resonant scanning portion.

19. The display of claim 13 wherein the periodic pattern is a substantially raster pattern.

20. A display device that produces a visible image in response to an input image signal having a plurality of components, comprising:

a screen, including a base plate and a wavelength converting coating responsive to output light of a first visible wavelength range in response to light of a first input wavelength, and responsive to output light of a second visible wavelength range in response to light of a second input wavelength;

a first light emitter operative to emit a first modulated beam of light of the first input wavelength in response to a first component of the image signal;

a second light emitter operative to emit a second modulated beam of light of the second input wavelength in response to a second component of the image signal; and a scanner assembly having an input aligned optically to receive the first and second modulated beams of light from the first and second light sources and an output aligned optically to direct the beams received at the input to the screen, the scanner assembly being responsive to a driving signal to scan the received beams onto the wavelength converting coating in a periodic pattern;

wherein the wavelength converting coating includes a first ultraviolet sensitive phosphor compound and the first input wavelength is an ultraviolet wavelength.

21. The display of claim 20 wherein the wavelength converting coating includes a second ultraviolet sensitive phosphor compound responsive to the second input wavelength.

22. The display of claim 21 wherein the second input wavelength is different than the first input wavelength.

23. The display of claim 20 wherein first light source includes a first laser diode.

24. The display of claim 23 wherein second light source includes a second laser diode.

* * * * *